US011165758B2

(12) United States Patent
Vaish

(10) Patent No.: US 11,165,758 B2
(45) Date of Patent: Nov. 2, 2021

(54) KEYSTREAM GENERATION USING MEDIA DATA

(71) Applicant: INTERNATIONAL BUSINESS MACHINES CORPORATION, Armonk, NY (US)

(72) Inventor: Niranjan Vaish, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 345 days.

(21) Appl. No.: 15/948,100

(22) Filed: Apr. 9, 2018

(65) Prior Publication Data

US 2019/0312853 A1 Oct. 10, 2019

(51) Int. Cl.
| | | |
|---|---|---|
| *H04L 29/06* | (2006.01) | |
| *H04L 9/14* | (2006.01) | |
| *H04L 9/08* | (2006.01) | |
| *H04L 9/30* | (2006.01) | |
| *G06F 16/41* | (2019.01) | |

(52) U.S. Cl.
CPC ........ *H04L 63/0457* (2013.01); *H04L 9/0861* (2013.01); *H04L 9/14* (2013.01); *H04L 9/30* (2013.01); *G06F 16/41* (2019.01)

(58) Field of Classification Search
CPC ..... H04L 63/0457; H04L 9/0861; H04L 9/14; H04L 9/30; G06F 16/41
See application file for complete search history.

(56) References Cited

U.S. PATENT DOCUMENTS

| | | | |
|---|---|---|---|
| 8,275,732 B2 | 9/2012 | Candelore | |
| 9,009,497 B1 | 4/2015 | Feng | |
| 9,503,764 B1* | 11/2016 | Drewry | ............... H04N 7/1675 |
| 2002/0006197 A1* | 1/2002 | Carroll | .................. H04L 9/0662 |
| | | | 380/44 |
| 2003/0149869 A1* | 8/2003 | Gleichauf | ............... H04L 45/50 |
| | | | 713/153 |
| 2005/0195975 A1* | 9/2005 | Kawakita | ............... H04L 9/0825 |
| | | | 380/30 |
| 2008/0219436 A1* | 9/2008 | Chen | ...................... H04N 7/162 |
| | | | 380/30 |

(Continued)

*Primary Examiner* — Samson B Lemma
*Assistant Examiner* — Zoha Piyadehghibi Tafaghodi
(74) *Attorney, Agent, or Firm* — Cantor Colburn LLP; Steven Chiu

(57) ABSTRACT

Systems, methods, and computer-readable media for generating a keystream using media data and using the keystream to encrypt and decrypt messages are described herein. The keystream may be generated independently and at least partially in parallel by both a sender and a receiver of a message. The sender may use its independently generated keystream to encrypt a message and a receiver may use its independently generated keystream to decrypt the message. Both the sender and receiver may utilize the same algorithm for generating their respective keystreams, thereby ensuring that the same keystream is generated by both sender and receiver. The sender may share a session key with a receiver using an asymmetric encryption technique. The session key may contain a collection of subkeys. Both the sender and the receiver may independently determine media database indices that match the subkeys and aggregate the corresponding media data streams to obtain the keystream.

20 Claims, 4 Drawing Sheets

(56) References Cited

U.S. PATENT DOCUMENTS

| | | | |
|---|---|---|---|
| 2012/0323925 A1* | 12/2012 | Fitzsimmons | G06F 16/41 707/741 |
| 2014/0112475 A1* | 4/2014 | Escort | H04W 12/02 380/270 |
| 2014/0237237 A1* | 8/2014 | Brumley | H04L 9/065 713/168 |
| 2014/0281514 A1* | 9/2014 | Erofeev | H04L 9/0897 713/165 |
| 2014/0304503 A1* | 10/2014 | O'Hare | H04L 63/0823 713/157 |
| 2015/0229471 A1 | 2/2015 | Nair et al. | |
| 2016/0020901 A1* | 1/2016 | Kurdziel | H04L 9/0838 380/28 |
| 2016/0149696 A1* | 5/2016 | Winslow | H04L 9/0618 380/28 |
| 2017/0264598 A1* | 9/2017 | Cordes | H04L 63/0435 |
| 2017/0366339 A1* | 12/2017 | Noura | G09C 1/00 |

* cited by examiner

KEYSTREAM GENERATION USING MEDIA DATA

BACKGROUND

Ciphers can be used for a variety of purposes such as encryption, authentication, or data integrity checks. Encryption algorithms are a category of ciphers used to encrypt and decrypt messages. Encryption algorithms can be broadly classified into three types: symmetric encryption algorithms, asymmetric encryption algorithms, and cryptographic hash functions. Symmetric encryption algorithms utilize a single key for both encryption and decryption; the sender encrypts a message using a key and the receiver decrypts the message using the same key. As such, symmetric encryption algorithms require both the sender and the receiver to have a copy of the key. Asymmetric encryption algorithms, on the other hand, utilize two keys: a private key and a public key. A sender uses the public key to encrypt a message and a receiver uses a private key to decrypt the message. Examples of symmetric encryption algorithms include Advanced Encryption Standard (AES), Data Encryption Standard (DES), and Triple DES. Examples of asymmetric encryption algorithms include Rivest-Shamir-Adleman (RSA) and Digital Signature Algorithm (DSA).

Symmetric encryption algorithms can be further divided into two groups: stream ciphers and block ciphers. A block cipher is an encryption algorithm that encrypts a fixed size of n-bits of data (referred to as a block) at one time. Block sizes may be 64 bits, 128 bits, 256 bits, or the like. In scenarios in which the number of bits of plaintext is less than the block size, padding schemes may be employed. The majority of the symmetric ciphers available for use are block ciphers including AES, DES, and Triple DES. In contrast, a stream cipher is an encryption algorithm that encrypts 1 bit or byte of plaintext at a time. A stream cipher may utilize an infinite stream of pseudorandom bits as a key. Both block ciphers and stream ciphers suffer from a number of drawbacks, technical solutions to which are described herein.

SUMMARY

In one or more example embodiments, a method for generating a keystream using media data stored in a database is disclosed. The method includes generating, by a computer processor of a sending device, a session key that includes a plurality of subkeys and identifying, by the computer processor, a plurality of media streams in the media data, where the plurality of media streams are stored at indices in the database that correspond to values of the plurality of subkeys. The method further includes aggregating, by the computer processor, the plurality of media streams to generate the keystream, encrypting, by the computer processor, a message using the keystream to generate an encrypted message, and sending, by the computer processor, the encrypted message to a receiving device.

In one or more other example embodiments, a system for generating a keystream using media data stored in a database is disclosed. The system includes at least one memory storing computer-executable instructions and at least one processor of a sending device, the at least one processor being configured to access the at least one memory and execute the computer-executable instructions to perform a set of operations. The operations include generating a session key that includes a plurality of subkeys and identifying a plurality of media streams in the media data, where the plurality of media streams are stored at indices in the database that correspond to values of the plurality of subkeys. The operations further include aggregating the plurality of media streams to generate the keystream, encrypting a message using the keystream to generate an encrypted message, and sending the encrypted message to a receiving device.

In one or more other example embodiments, a computer program product for generating a keystream using media data stored in a database is disclosed. The computer program product includes a non-transitory storage medium readable by a processing circuit, the storage medium storing instructions executable by the processing circuit to cause a method to be performed. The method includes generating a session key that includes a plurality of subkeys and identifying a plurality of media streams in the media data, where the plurality of media streams are stored at indices in the database that correspond to values of the plurality of subkeys. The method further includes aggregating the plurality of media streams to generate the keystream, receiving, by a receiving device, an encrypted message from a sending device, and decrypting the encrypted message using the keystream to obtain an original message.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
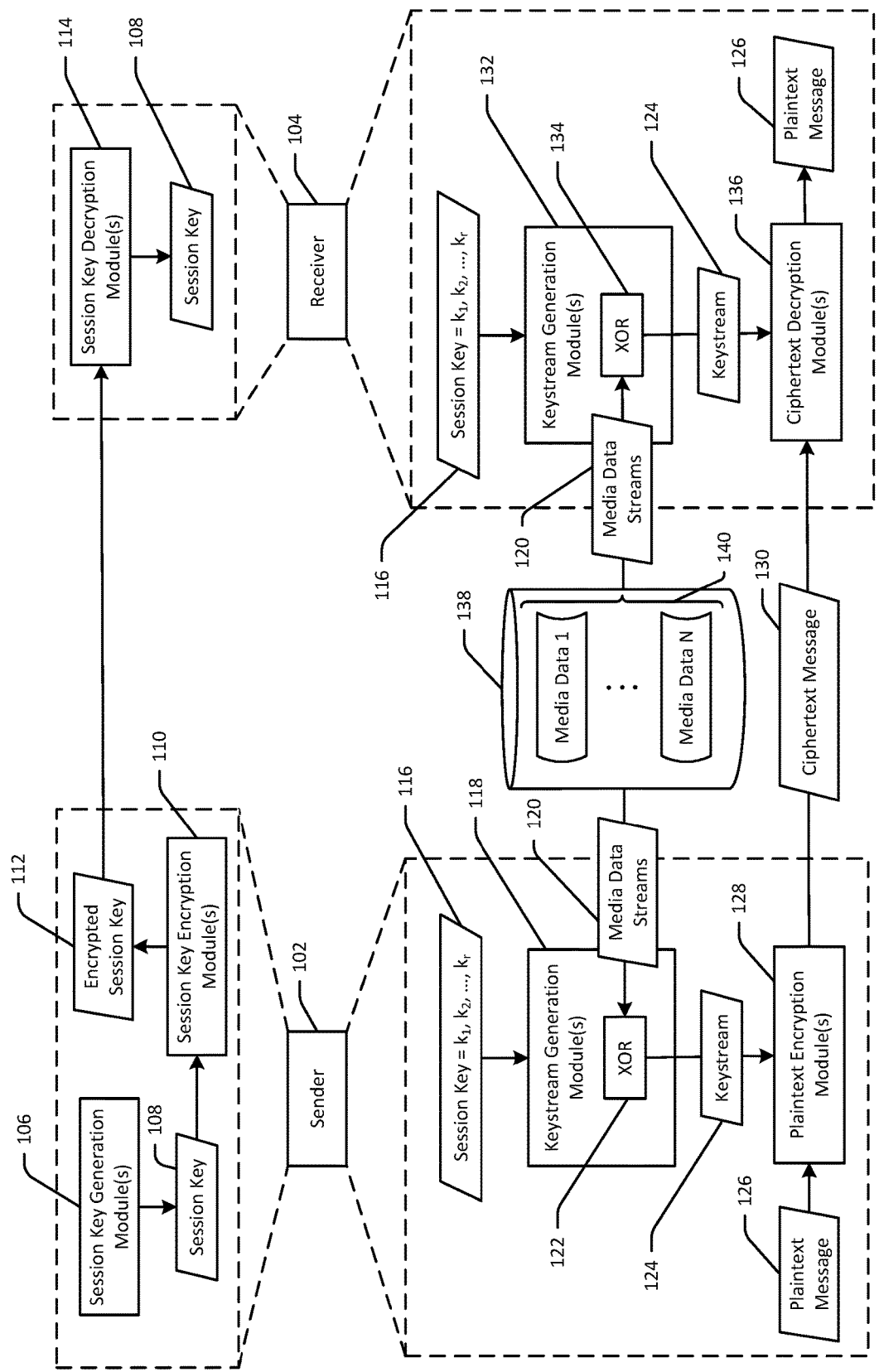
FIG. 1 is a schematic hybrid data flow/block diagram illustrating keystream generation using media data in accordance with example embodiments.

Example embodiments include, among other things, systems, methods, computer-readable media, techniques, and methodologies for generating a keystream using media data and using the keystream to encrypt and decrypt messages. In certain example embodiments, the keystream may be generated independently and at least partially in parallel by both a sender of a message and a receiver of the message. More specifically, the keystream used by a sender to encrypt a plaintext message may be independently generated by a receiver to decrypt the encrypted message. Both the sender and receiver may utilize the same algorithm for generating their respective keystreams, thereby ensuring that the same keystream is generated by both sender and receiver.

Example embodiments relate to an encryption algorithm that provides at least some of the benefits of stream and block ciphers, respectively, while also addressing at least some of the drawbacks associated with such ciphers. A stream cipher is an encryption algorithm that encrypts 1 bit or byte of plaintext at a time using an infinite stream of pseudorandom bits as a key. Stream ciphers suffer from various limitations including, for example, increased vulnerability to attack if a key is reused and periodicity of the pseudorandom number generator used to generate the key. Stream ciphers, however, also provide the benefit of being able to encrypt a continuous stream of message bits.

In the case of key reuse in a stream cipher, the same key k is used to encrypt two different plaintext messages a and b yielding encrypted messages A=a exclusive-or (XOR) k and B=b XOR k. It follows then from properties of the XOR operation that A XOR B=a XOR b. Thus, a potential attacker in possession of encrypted messages A and B can perform an XOR of messages A and B to obtain the XOR of the original plaintext messages a and b (a XOR b) assuming that messages a and b were encrypted using the same stream cipher key. The potential attacker may then be able to identify statistical patterns present in (a XOR b) from which the key k can potentially be ascertained. In addition, because the generation of the key in a stream cipher is not entirely random but rather pseudorandom, it may be possible for a potential attacker to identify patterns inherent in the key generation process and potentially discover the key. Further, stream ciphers suffer from the additional limitation that the key that is generated must be the same bit length as the plaintext message, which may make it impractical for a sender to share confidentially with a receiver in many scenarios.

Like stream ciphers, block ciphers also suffer from various limitations. A block cipher is an encryption algorithm that encrypts a message one block (a fixed size of n-bits of data) at a time. A block cipher is computationally more expensive than a stream cipher, and thus, requires more computational time to encrypt and decrypt messages than a stream cipher does. Block ciphers, however, also provide some benefits over stream ciphers including the capability to use keys that are shorter in length than the message as well as the capability to reuse keys without compromising security.

An encryption algorithm in accordance with example embodiments provides some of the respective benefits of stream ciphers and block ciphers while at the same time avoiding some of their limitations. In particular, as will be described in more detail hereinafter, the key used to generate a keystream in accordance with example embodiments can be reused without compromising security. More specifically, in accordance with example embodiments, a key is used to identify database indices at which media data streams are stored, which are then aggregated to generate the keystream. Thus, even if the key is reused, any alteration to the media data stored at the database indices or accessing a different media database altogether would result in a different keystream, thereby ensuring that the same keystream is not reused for different messages, and as a consequence, ensuring that security is not compromised. As such, an encryption algorithm in accordance with example embodiments provides the capability to reuse keys—a benefit of block ciphers—while also providing the relative computational simplicity of a keystream capable of continuously encrypting message data one bit or byte at a time—a benefit of stream ciphers. Stated another way, an encryption algorithm in accordance with example embodiments avoids the limitation of stream ciphers on reuse of keys and also avoids the computational complexity associated with block ciphers by not having to encrypt data in blocks (due to generation of the keystream). In addition, an encryption algorithm in accordance with example embodiments avoids the need for a sender to share a potentially lengthy secret key with a receiver (as is the case with stream ciphers) because the keystream can be independently generated by the receiver based on a shorter session key.

Various illustrative methods of the disclosure and corresponding data structures associated therewith will now be described. It should be noted that each operation of the method 200 and/or the method 300 may be performed by one or more of the program modules or the like depicted in FIG. 1 or 4, whose operation will be described in more detail hereinafter. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Figure 2:
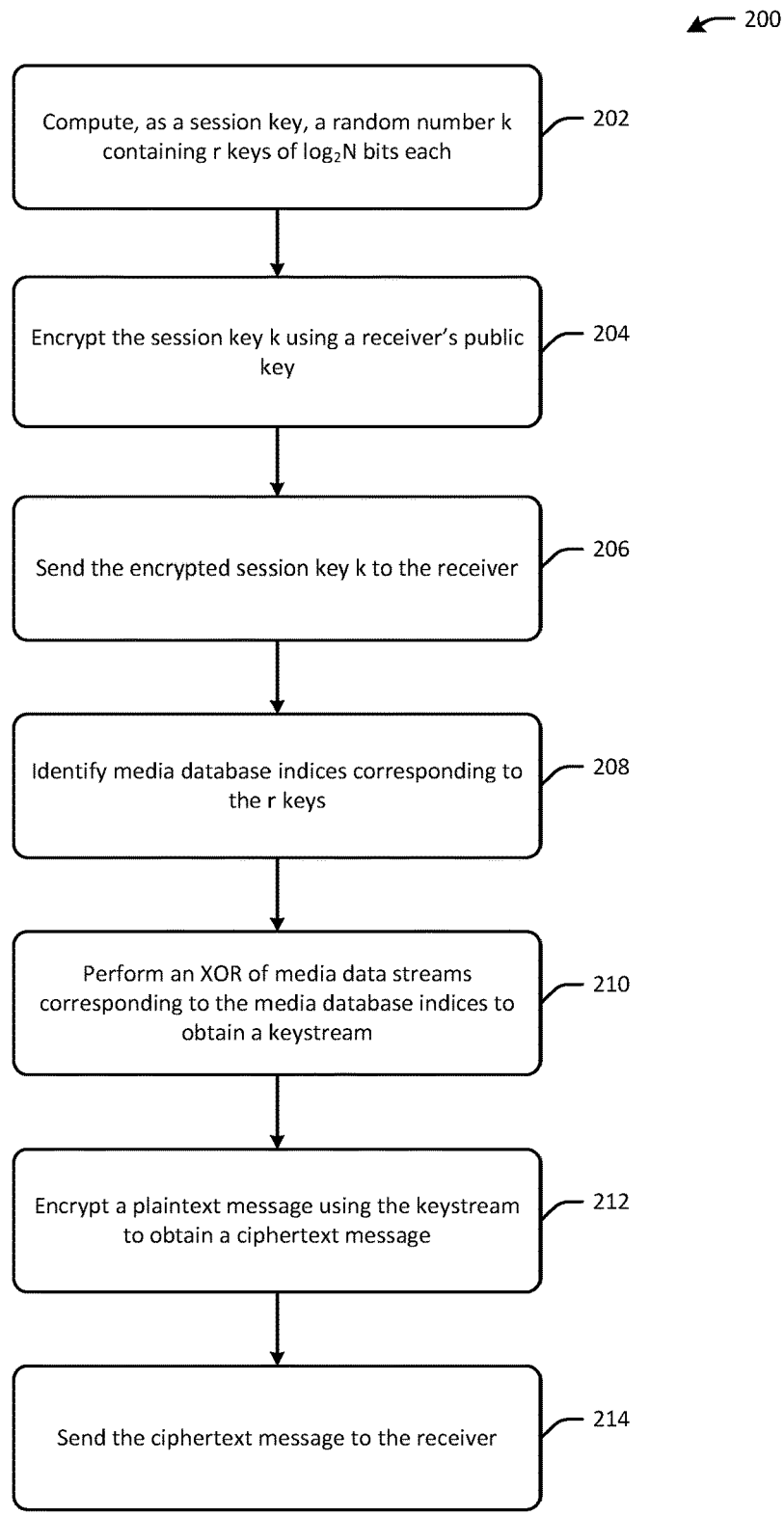
FIG. 2 is a process flow diagram of an illustrative method for generating a keystream using media data, encrypting a plaintext message using the keystream to generate a ciphertext message, and sending the ciphertext message to a receiver in accordance with one or more example embodiments.
Figure 3:
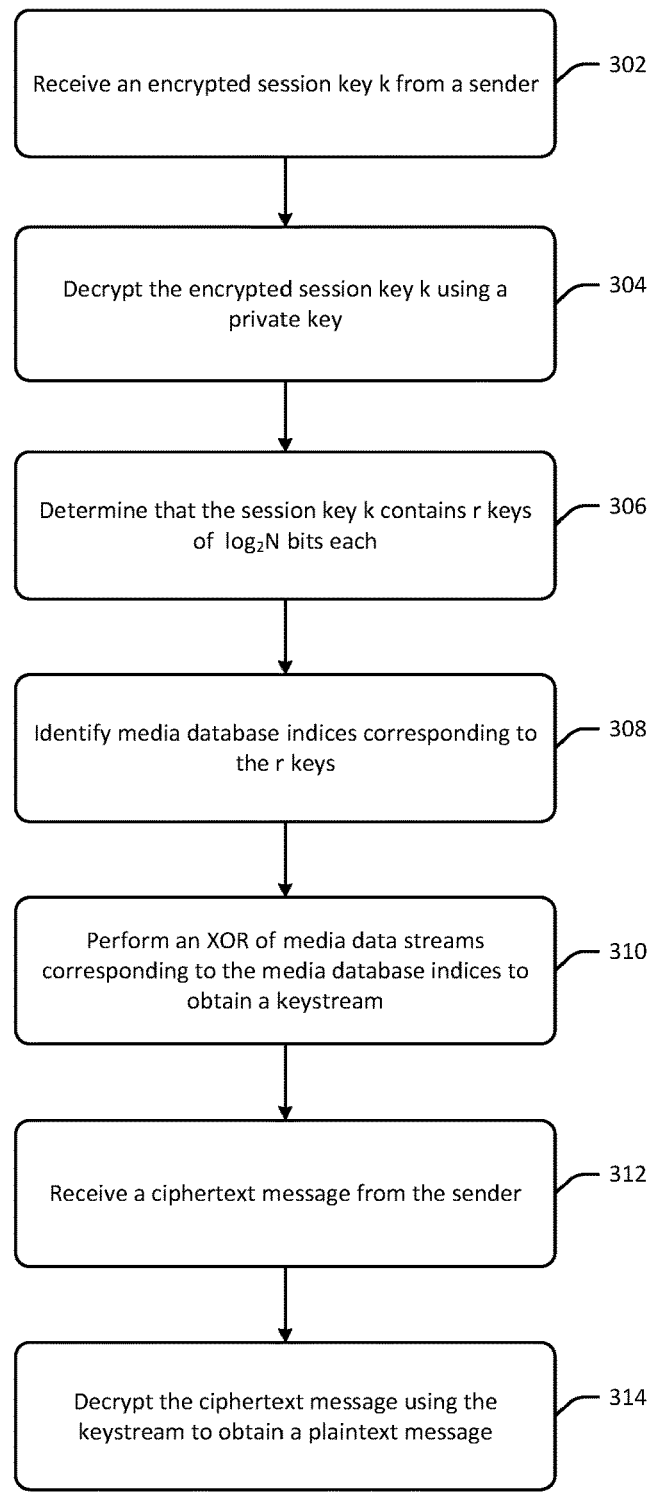
FIG. 3 is a process flow diagram of an illustrative method for generating a keystream using media data and using the keystream to decrypt a ciphertext message received from a sender in accordance with one or more example embodiments.

FIG. 1 is a schematic hybrid data flow/block diagram illustrating keystream generation using media data. FIG. 2 is a process flow diagram of an illustrative method 200 for generating a keystream using media data, encrypting a plaintext message using the keystream to obtain a ciphertext message, and sending the ciphertext message to a receiver. FIG. 3 is a process flow diagram of an illustrative method 300 for generating a keystream using media data and using the keystream to decrypt a ciphertext message received from a sender. FIGS. 2 and 3 will each be described in conjunction with FIG. 1 hereinafter.

Referring first to FIG. 2 in conjunction with FIG. 1, a sender 102 may compute a session key 108 at block 202 of the method 200. As used herein, the term sender 102 may refer to one or more computing devices (e.g., a server, a desktop computer, a laptop computer, a smartphone, a tablet, a wearable device, or any other suitable network-connected device) associated with a sending entity; however, it should be appreciated that the sender 102 may also refer to the sending entity itself. More specifically, at block 202, computer-executable instructions of one or more session key generation module(s) 106 associated with the sender 102 (e.g., residing on one or more computing devices associated with a sending entity) may be executed to compute the session key 108. The session key 108 may contain multiple subkeys, each of which may contain a same number of bits. In particular, in accordance with example embodiments, the session key 108 may contain r subkeys, where each subkey is $\log_2 N$ bits in length. A pseudorandom number generator may be used to generate the session key 108.

Then, at block 204 of the method 200, the session key 108 may be provided as input to one or more session key encryption module(s) 110 of the sender 102, and computer-executable instructions of the session key encryption module(s) 110 may be executed to encrypt the session key 108 using a public key to generate an encrypted session key 112. In certain example embodiments, RSA encryption may be used to encrypt the session key 108. While example embodiments may be described herein in the context of a particular form of RSA encryption, it should be appreciated that other, more advanced forms of RSA encryption or other types of asymmetric encryption algorithms may be used to encrypt the session key 108 for the purposes of securely communicating the key to a receiver 104.

A basic principle behind RSA encryption is the observation that it is practical to find three very large positive integers (e, d, and n) such that with modular exponentiation for all integers m (where $0 \leq m < n$) the following holds: $(m^e)^d \equiv m \pmod{n}$, and where despite having knowledge of e and n or even m, discovering d is extremely difficult. As part of the key generation process in RSA encryption, two distinct prime numbers p and q may be chosen and their product n=pq may be computed. The prime numbers p and q may be chosen at random and may be similar in magnitude but may differ in length by a few digits to make factoring more difficult. The value n serves as the modulus for both the public and private keys that are used, and its length, usually expressed in bits, is the key length.

After computing n, a Carmichael's totient function $\lambda(n)=1$ cm($\lambda(p), \lambda(q)$)=1 cm(p-1, q-1) may be computed. As a non-limiting example, assume that the prime numbers 61 and 53 are chosen as the prime numbers p and q, respectively (in actual practice the prime numbers selected for p and q would be significantly larger). Then, n=3233 and $\lambda(n)=\lambda$(3233)=1 cm($\lambda(p), \lambda(q)$)=1 cm(61-1, 53-1)=1 cm(60, 52)=780. The values e and d may then be found such that $e*d \equiv 1 \pmod{\lambda(n)}$. In particular, e may be chosen such that $1 < e < \lambda(n)$ and e is coprime with $\lambda(n)$. Referring again to the example introduced above, e may be selected to be 17, which is coprime with 780. Selecting a prime number as e requires only checking that e is not a divisor of $\lambda(n)$ to ensure that e and $\lambda(n)$ are coprime. The value d may then be computed as the modular multiplicative inverse of e (i.e., $d \equiv e^{-1} \pmod{\lambda(n)}$). Referring again to the example introduced earlier, selecting e to be 17 would result in d=413 because 413 * 17 mod 780=1. The value e becomes the public key component and the value d becomes the private key component. In particular, the public key is (n, e) and the private key is (n, d). The public key (n, e) may be transmitted by an owner to others via a reliable—but necessarily secure route—to enable others to encrypt messages with the public key. The encrypted messages can be decrypted only by the owner using her private key (n, d), which is never distributed.

Referring again FIG. 2, in certain example embodiments, RSA encryption may be used to securely transmit the session key 108 from the sender 102 to the receiver 104. In particular, computer-executable instructions of the session key encryption module(s) 110 may be executed at block 204 of the method 200 to encrypt the session key 108 using a public key (e.g., (n, e)) previously received from the receiver 104. More specifically, assuming that the session key 108 is given by k, then k may be encrypted as $c=k^e \mod n$, where c is the ciphertext (i.e., the encrypted session key 112). Then, at block 206 of the method 200, the sender 102 may send the encrypted session key 112 to the receiver 104. Decryption of the encrypted session key 112 by the receiver 104 using his private key (e.g., (n, d)) may be given as $c^d \mod n = k$. That is, the receiver 104 may raise the encrypted session key c to the power of d (the private key component) modular n to obtain the session key 108. Decryption of the encrypted session key 112 will be described in more detail later in this disclosure in reference to FIG. 3.

Blocks 208-214 of the method 200 reference operations performed to utilize the session key 108 to generate a keystream from media data and encrypt a plaintext message using the keystream to obtain a ciphertext message in accordance with example embodiments. As previously noted, the session key 108 may contain r subkeys where each subkey is $\log_2 N$ bits in length. In particular, the session key 108 may be deliberately computed to contain the r subkeys of $\log_2 N$ bits each in length. The session key 108 may thus be represented as a collection 116 of subkeys $k_1, k_2, \ldots, k_r$=session key k, where each $k_i$ is $\log_2 N$ bits in length. At block 208 of the method 200, computer-executable instructions of one or more keystream generation modules 118 may be executed to identify media database indices corresponding to the collection 116 of r subkeys. In particular, the keystream generation module(s) 118 may be executed to access a media database 138 to identify, for each subkey $k_i$, a respective matching index in the media database 138. More specifically, the media database 138 may store, for example, a collection 140 of media data streams 1 to N, where each media data stream may be stored in the media database 138 at a corresponding database index. The media data streams may include audio/visual content, text content, or any other suitable content. The keystream generation module(s) 118 may thus be executed at block 208 of the method 200 to identify database indices that match the collection 116 of subkeys, and in turn, the media data streams 120 corresponding to those matching database indices. It should be appreciated that the media database 138 may, in certain example embodiments, be a group of one or more datastores accessible by the sender 102 and the receiver 104.

At block 210 of the method 200, computer-executable instructions of the keystream generation module(s) 118 may be executed to aggregate the media data streams 120 corresponding to the matching database indices to obtain a keystream 124. More specifically, in certain example embodiments, the keystream generation module(s) 118 may perform an XOR 122 of the media data streams 120 to obtain the keystream 124. In certain example embodiments, because session key 108 contains r subkeys, r matching database indices are identified at block 208, and consequently, r media data streams 120 corresponding to the r matching indices may be XORed at block 210 to obtain the keystream 124. For instance, if the media data streams 120 are represented as $MD[k_1], MD[k_2], MD[k_r]$, then the keystream 124 may be represented as keystream[i]=$MD[k_1]$ XOR $MD[k_2]$ XOR . . . XOR $MD[k_r]$.

Various techniques may be employed to handle scenarios in which an input message to be encrypted using the keystream 124 is longer than media content at any of the database indices matching the subkeys $k_1, k_2, \ldots, k_r$. Such techniques may include, for instance, wrapping the media content to the beginning; moving to the next index content; and/or defining a skip-index. With respect to the wrapping technique, if a message to be encrypted is longer than a media data stream, then wrapping may be employed which may include concatenating the media stream with at least a portion of the media stream starting from the beginning of the stream in order to obtain a longer media stream that is at least as long as the message. In other example embodiments, a skip-index may be defined such that if a particular media stream is encountered that is shorter than the message length, another media stream stored at a predefined skip-index (e.g., a predetermined database index) may be used in lieu of the particular media stream or at least a portion thereof may be concatenated with the particular media stream and used, at least in part, to generate the keystream 124.

With respect to the moving to next index content technique, if a message to be encrypted is longer than a media data stream corresponding to a particular database index that matches one of the r subkeys, then the keystream generation module(s) 118 may assess the media content corresponding to the next database index. If the media data stream corresponding to the next database index is at least as long as the message, then that media data stream may be selected in lieu of the media data stream corresponding to the particular database index. If not, then the keystream generation module(s) 118 may assess the media content at each successive index until a media data stream of suitable length is identified. In certain example embodiments, rather than selecting a media data stream corresponding to a successive database index in lieu of a media data stream corresponding to the particular matching database index, the two streams (or at least portions thereof) may be concatenated in order to generate a longer media data stream of suitable length.

In certain example embodiments, different media streams stored in the database 138 may have different lengths to avoid periodicity detection. In particular, if the media content at each database index is a different length, a randomness is introduced that makes it more difficult for an attacker to detect any periodicity in connection with any of the media stream lengthening techniques described above.

Once the keystream 124 is generated, computer-executable instructions of one or more plaintext encryption modules 128 may be executed, at block 212 of the method 200, to encrypt a plaintext message 126 using the keystream 124 to obtain a ciphertext message 130. Encrypting the plaintext message 126 using the keystream 124 may include performing an XOR of the plaintext message 126 with the keystream 124 on a per-bit or per-byte basis. The resultant output may be the ciphertext message 130. Then, at block 214 of the method 200, the ciphertext message 130 may be sent to the receiver 104.

Referring now to FIG. 3 in conjunction with FIG. 1, at block 302 of the method 300, the receiver 104 may receive the encrypted session key 112 from the sender 102. The sender 102 may have encrypted the session key 108 using a public key associated with the receiver 104. At block 304 of the method 300, computer-executable instructions of one or more session key decryption modules 114 may be executed to decrypt the encrypted session key 112 to obtain the original session key 108. In particular, in certain example embodiments, the receiver 104 may utilize a private key that is not shared to decrypt the encrypted session key 112. As previously noted, the asymmetric public-private encryption used to send the session key 108 securely from the sender 102 to the receiver 104 may be an RSA technique.

Upon obtaining the unencrypted session key 108, the receiver 104 may determine, at block 306 of the method 300, that the session key contains r subkeys, where each subkey is $\log_2 N$ bits in length. As previously noted, the session key 108 may be represented as a collection 116 of subkeys $k_1$, $k_2$, ..., $k_r$=session key k, where each $k_i$ is $\log_2 N$ bits in length. The receiver 104 may then perform the operations at block 308 and 310, which may correspond to the operations 208 and 210 of the method 200 performed by the sender 102. More specifically, the receiver 104 may perform the operations 308 and 310 at least partially in parallel with the operations 208 and 210 performed by the sender 102 such that both the sender 102 and the receiver 104 may generate the same keystream 124 at least partially concurrently.

In particular, at block 308 of the method 300, computer-executable instructions of one or more keystream generation modules 132 associated with the receiver 104 may be executed to identify the media database indices corresponding to the collection 116 of r subkeys. In particular, the keystream generation module(s) 132 may be executed to access a media database 138 to identify, for each subkey $k_i$, a respective matching index in the media database 138, and in turn, the media data streams 120 corresponding to those matching database indices.

Then, at block 310 of the method 300, computer-executable instructions of the keystream generation module(s) 132 may be executed to aggregate the media data streams 120 corresponding to the matching database indices to obtain the keystream 124. More specifically, in certain example embodiments, the keystream generation module(s) 132 may perform an XOR 134 of the media data streams 120 to obtain the keystream 124. As previously described in connection with the sender 102, if the media data streams 120 are represented as $MD[k_1]$, $MD[k_2]$, $MD[k_r]$, then the keystream 124 generated by the receiver 104 may be represented as keystream[i]=$MD[k_1]$ XOR $MD[k_2]$ XOR ... XOR $MD[k_r]$. It is ensured that the sender 102 and the receiver 104 generate the same keystream 124 because the sender 102 and the receiver 104 utilize the same session key 108 containing the same collection 116 of subkeys to access the same media database 138 to identify database indices that match the subkeys. As a result, the sender 102 and the receiver 104 identify the same matching database indices, and thus, the same corresponding media data streams, which when XORed with one another produce the same keystream 124. In certain example embodiments, if one of the techniques described earlier for lengthening a media data stream is used, the sender 102 and receiver 104 may utilize the same technique to ensure that the same set of media data streams are used by both to obtain the keystream 124.

At block 312 of the method 300, the receiver 104 may receive the ciphertext message 130 from the sender 102. At block 314 of the method 300, computer-executable instructions of one or more ciphertext decryption modules 136 may be executed to decrypt the ciphertext message 130 using the keystream 124 to obtain the original plaintext message 126. In particular, the ciphertext decryption module(s) 136 may be executed to perform an XOR of the keystream 124 with the ciphertext message 130 on a per-bit or per-byte basis to obtain the original plaintext message 126. Thus, according to the methods 200 and 300, the session key 108 can be securely transmitted between the sender 102 and the receiver 104 using, for example, an asymmetric encryption algorithm such as RSA encryption. The sender 102 and receiver 104 may then utilize that same session key 108 (which contains a collection of r subkeys) to generate, at least partially in parallel, the same keystream 124, which is used both by the sender 102 to encrypt the plaintext message 126 and by the receiver 104 to decrypt the ciphertext message 130.

In certain example embodiments, because the session key 108 (e.g., a session key k) is randomly generated, each of the subkeys r of the session key k are also random in nature. Further, because each subkey r is $\log_2 N$ bits in length, each subkey r can take on any value between 1 and N. Thus, the number of possible values for the keystream 124 is N* N* . . . "r" times which equals $N^r$. Therefore, a potential attacker having only the ciphertext message 130 at his disposal would need to try $N^r$ combinations of media streams to determine the keystream 124, thereby providing an order of security of $N^r$.

A typical security requirement is, for example, an order of security of $2^{128}$, which can be achieved for $N=2^{16}$ and r=8. This implies that the session key k should be a 128-bit random number because 8 subkeys, each being $\log_2(2^{16})=16$ bits in length, would produce an 8*16=128 bit key. For scenarios that require even stricter security, the number of subkeys r may be increased. For example, if the number of subkeys r equals 16, this would imply that the session key k is a 256-bit random number ($r*\log_2 N=16*\log_2(2^{16})=16*16=256$), which provides an order of security of $2^{256}$. In addition to increasing the number of subkeys r, the length of each subkey may be increased by, for example, increasing N to further improve security. Further, in certain example embodiments, various media data streams in the media database 138 may be randomly swapped out with new media data streams in order to even further improve security.

Example embodiments of the disclosure provide various technical features, technical effects, and/or improvements to computer technology that solve certain technical problems associated with block ciphers and stream ciphers. In particular, example embodiments relate to an encryption algorithm that provides at least some of the benefits of stream and block ciphers, respectively, while also addressing at least some of the drawbacks associated with such ciphers.

As previously noted, stream ciphers suffer from various limitations including, for example, increased vulnerability to attack if a key is reused and periodicity of the pseudorandom number generator used to generate the key. Stream ciphers, however, also provide the benefit of being able to encrypt a continuous stream of message bits. Further, stream ciphers suffer from the additional limitation that the key that is generated must be the same bit length as the plaintext message, which may make it impractical for a sender to share confidentially with a receiver in many scenarios.

Like stream ciphers, block ciphers also suffer from various limitations. A block cipher is computationally more expensive than a stream cipher, and thus, requires more computational time to encrypt and decrypt messages than a stream cipher does. Block ciphers, however, also provide some benefits over stream ciphers including the capability to use keys that are shorter in length than the message as well as the capability to reuse keys without compromising security.

An encryption algorithm in accordance with example embodiments provides the technical effect of achieving some of the respective benefits of stream ciphers and block ciphers while at the same time avoiding some of their limitations. In particular, an encryption algorithm in accordance with example embodiments provides the technical effect of being able to reuse the key that is used to generate the keystream without compromising security. This technical effect is achieved by the technical features of sharing a session key between a sender and a receiver in a secure manner using, for example, an asymmetric encryption technique, and providing an encryption algorithm that can be executed in parallel by both the sender and the receiver to generate the same keystream from the session key. Thus, even if the key is reused, any alteration to the media data stored at the database indices or accessing a different media database altogether would result in a different keystream, thereby ensuring that the same keystream is not reused for different messages, and as a consequence, ensuring that security is not compromised. As such, an encryption algorithm in accordance with example embodiments provides an improvement to computer technology—specifically computer encrypted technology—by providing a technical benefit of block ciphers (the ability to reuse keys) while also avoiding the security vulnerabilities associated with key reuse in stream ciphers because only the session key and not the keystream is shared between the sender and the receiver.

An encryption algorithm in accordance with example embodiments also provides the technical effect of providing the computational simplicity of a stream cipher (the generation of the keystream is computationally less expensive than a block cipher) while avoiding the need for a sender to share a potentially lengthy secret key with a receiver (as is the case with stream ciphers). This is so because the keystream can be independently generated by the receiver based on the shorter key session key, and thus, the sender need not share the keystream with the receiver, but rather, only needs to share the session key.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 4:
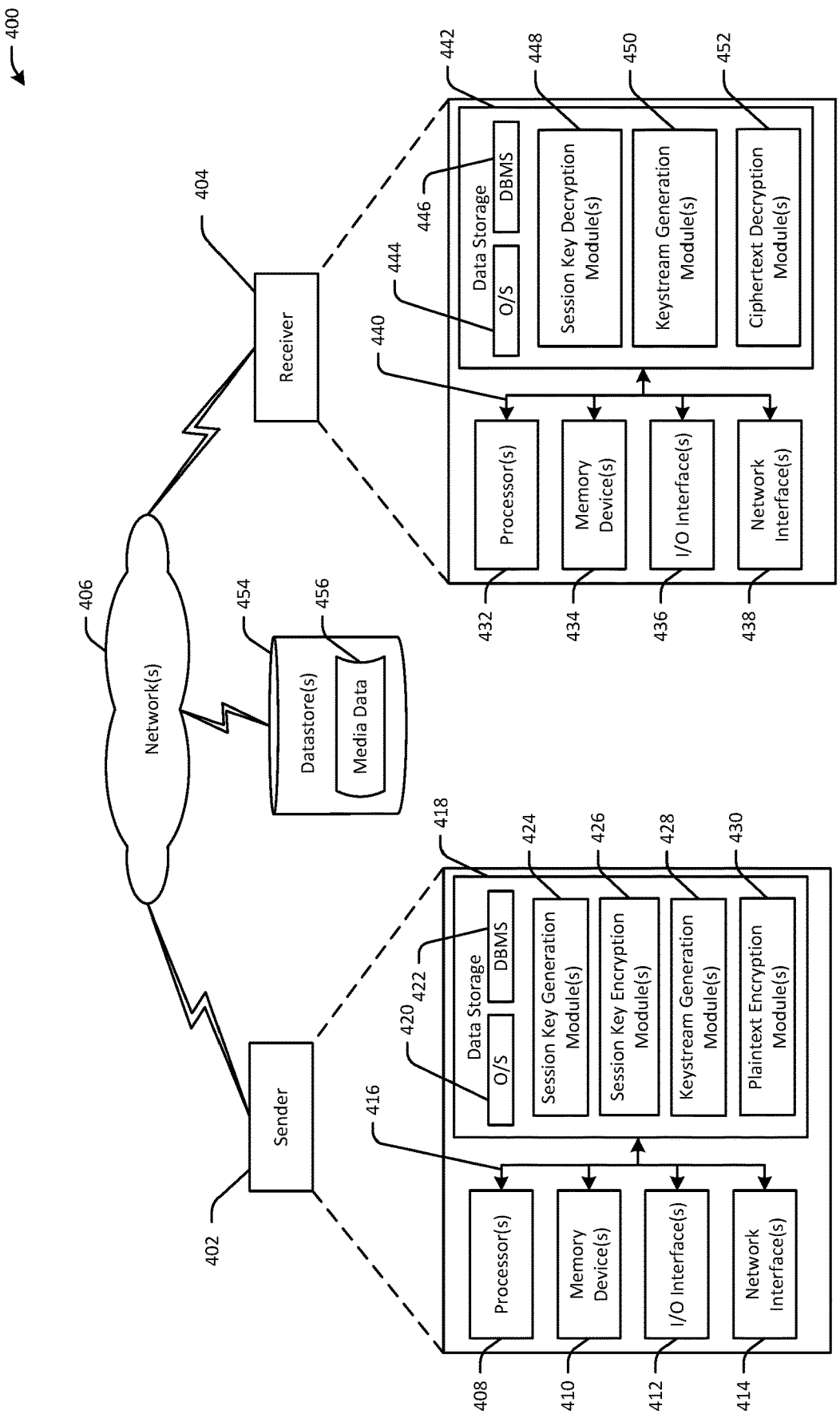
FIG. 4 is a schematic diagram of an illustrative networked architecture configured to implement one or more example embodiments.

FIG. 4 is a schematic diagram of an illustrative networked architecture 400 configured to implement one or more example embodiments of the disclosure. For example, in the illustrative implementation depicted in FIG. 4, the networked architecture 400 includes a sender 402 and a receiver 404. The sender 102 and the receiver 104 may each include any device(s) configured to execute an encryption algorithm in accordance with example embodiments including, without limitation, a server, a personal computer (PC), a tablet, a smartphone, a wearable device, a voice-enabled device, or the like. While any particular component of the networked architecture 400 may be described herein in the singular, it should be appreciated that multiple instances of any such component may be provided, and functionality described in connection with a particular component may be distributed across multiple ones of such a component.

The sender 402 and the receiver 404 may be configured to communicate via one or more networks 406. The network(s) 406 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 406 may have any suitable communication range associated therewith and may include, for example, global networks (e.g., the Internet), metropolitan area networks (MANs), wide area networks (WANs), local area networks (LANs), or personal area networks (PANs). In addition, the network(s) 406 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the sender 402 may include one or more processors (processor(s)) 408, one or more memory devices 410 (generically referred to herein as memory 410), one or more input/output ("I/O") interface(s) 412, one or more network interfaces 414, and data storage 418. The sender 402 may further include one or more buses 416 that functionally couple various components of the sender 402.

The bus(es) 416 may include at least one of a system bus, a memory bus, an address bus, or a message bus, and may permit the exchange of information (e.g., data (including computer-executable code), signaling, etc.) between various components of the sender 402. The bus(es) 416 may include, without limitation, a memory bus or a memory controller, a peripheral bus, an accelerated graphics port, and so forth. The bus(es) 416 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 410 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 410 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 410 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 418 may include removable storage and/or non-removable storage including, but not limited to, magnetic storage, optical disk storage, and/or tape storage. The data storage 418 may provide non-volatile storage of computer-executable instructions and other data. The memory 410 and the data storage 418, removable and/or non-removable, are examples of computer-readable storage media (CRSM) as that term is used herein.

The data storage 418 may store computer-executable code, instructions, or the like that may be loadable into the memory 410 and executable by the processor(s) 408 to cause the processor(s) 408 to perform or initiate various operations. The data storage 418 may additionally store data that may be copied to memory 410 for use by the processor(s) 408 during the execution of the computer-executable instructions. Moreover, output data generated as a result of execution of the computer-executable instructions by the processor(s) 408 may be stored initially in memory 410 and may ultimately be copied to data storage 418 for non-volatile storage.

More specifically, the data storage 418 may store one or more operating systems (O/S) 420; one or more database management systems (DBMS) 422 configured to access the memory 410 and/or one or more external datastores 454; and one or more program modules, applications, engines, managers, computer-executable code, scripts, or the like such as, for example, session key generation module(s) 424, session key encryption module(s) 426, keystream generation module(s) 428, and plaintext encryption module(s) 430. Any of the components depicted as being stored in data storage 418 may include any combination of software, firmware, and/or hardware. The software and/or firmware may include computer-executable instructions (e.g., computer-executable program code) that may be loaded into the memory 410 for execution by one or more of the processor(s) 408 to perform any of the operations described earlier in connection with correspondingly named modules.

Although not depicted in FIG. 4, the data storage 418 may further store various types of data utilized by components of the sender 402 (e.g., data stored in the datastore(s) 454). Any data stored in the data storage 418 may be loaded into the memory 410 for use by the processor(s) 408 in executing computer-executable instructions. In addition, any data stored in the data storage 418 may potentially be stored in the external datastore(s) 454 and may be accessed via the DBMS 422 and loaded in the memory 410 for use by the processor(s) 408 in executing computer-executable instructions.

The processor(s) 408 may be configured to access the memory 410 and execute computer-executable instructions loaded therein. For example, the processor(s) 408 may be configured to execute computer-executable instructions of the various program modules, applications, engines, managers, or the like of the sender 402 to cause or facilitate various operations to be performed in accordance with one or more embodiments of the disclosure. The processor(s) 408 may include any suitable processing unit capable of accepting data as input, processing the input data in accordance with stored computer-executable instructions, and generating output data. The processor(s) 408 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 408 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 408 may be capable of supporting any of a variety of instruction sets.

Referring now to other illustrative components depicted as being stored in the data storage 418, the O/S 420 may be loaded from the data storage 418 into the memory 410 and may provide an interface between other application software executing on the sender 402 and hardware resources of the sender 402. More specifically, the O/S 420 may include a set of computer-executable instructions for managing hardware resources of the sender 402 and for providing common services to other application programs. In certain example embodiments, the O/S 420 may include or otherwise control execution of one or more of the program modules, engines, managers, or the like depicted as being stored in the data storage 418. The O/S 420 may include any operating system now known or which may be developed in the future including, but not limited to, any server operating system, any mainframe operating system, or any other proprietary or non-proprietary operating system.

The DBMS 422 may be loaded into the memory 410 and may support functionality for accessing, retrieving, storing, and/or manipulating data stored in the memory 410, data stored in the data storage 418, and/or data stored in external datastore(s) 454. The DBMS 422 may use any of a variety of database models (e.g., relational model, object model, etc.) and may support any of a variety of query languages. The DBMS 422 may access data represented in one or more data schemas and stored in any suitable data repository. Data stored in the datastore(s) 454 may include, for example, media data 456. For instance, the datastore(s) 454 may include the media database 138 and the media data 456 may include the media data streams 140. External datastore(s) 454 that may be accessible by the sender 402 via the DBMS 422 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the sender 402, the input/output (I/O) interface(s) 412 may facilitate the receipt of input information by the sender 402 from one or more I/O devices as well as the output of information from the sender 402 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the sender 402 or may be separate. The I/O devices may further include, for example, any number of peripheral devices such as data storage devices, printing devices, and so forth.

The I/O interface(s) 412 may also include an interface for an external peripheral device connection such as universal serial bus (USB), FireWire, Thunderbolt, Ethernet port or other connection protocol that may connect to one or more networks. The I/O interface(s) 412 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The sender 402 may further include one or more network interfaces 414 via which the sender 402 may communicate with any of a variety of other systems, platforms, networks, devices, and so forth. The network interface(s) 414 may enable communication, for example, with one or more other devices via one or more of the network(s) 406.

In an illustrative configuration, the receiver 404 may include one or more processors (processor(s)) 432, one or more memory devices 434 (generically referred to herein as memory 434), one or more input/output ("I/O") interface(s) 436, one or more network interfaces 438, and data storage 442. The receiver 404 may further include one or more buses 440 that functionally couple various components of the receiver 404.

The bus(es) 440 may include any of types of bus(es) described in connection with the bus(es) 416. Similarly, the memory 434 may include any of the types of memory described in connection with the memory 410. Further, similar to the data storage 418, the data storage 442 may store computer-executable code, instructions, or the like that may be loadable into the memory 434 and executable by the processor(s) 432 to cause the processor(s) 432 to perform or initiate various operations. The data storage 442 may additionally store data that may be copied to memory 434 for use by the processor(s) 432 during the execution of the computer-executable instructions. Moreover, output data generated as a result of execution of the computer-executable instructions by the processor(s) 432 may be stored initially in memory 434 and may ultimately be copied to data storage 442 for non-volatile storage.

More specifically, the data storage 442 may store one or more operating systems (O/S) 444; one or more database management systems (DBMS) 446 configured to access the memory 434 and/or the external datastore(s) 454; and one or more program modules, applications, engines, managers, computer-executable code, scripts, or the like such as, for example, session key decryption module(s) 448, keystream generation module(s) 450, and ciphertext decryption module(s) 452. Any of the components depicted as being stored in data storage 442 may include any combination of software, firmware, and/or hardware. The software and/or firmware may include computer-executable instructions (e.g., computer-executable program code) that may be loaded into the memory 434 for execution by one or more of the processor(s) 432 to perform any of the operations described earlier in connection with correspondingly named modules.

Although not depicted in FIG. 4, the data storage 442 may further store various types of data utilized by components of the receiver 404 (e.g., data stored in the datastore(s) 454). Any data stored in the data storage 442 may be loaded into the memory 434 for use by the processor(s) 432 in executing computer-executable instructions. In addition, any data stored in the data storage 442 may potentially be stored in the external datastore(s) 454 and may be accessed via the DBMS 446 and loaded in the memory 434 for use by the processor(s) 432 in executing computer-executable instructions.

The processor(s) 432 may be configured to access the memory 434 and execute computer-executable instructions loaded therein. For example, the processor(s) 432 may be configured to execute computer-executable instructions of the various program modules, applications, engines, managers, or the like of the receiver 404 to cause or facilitate various operations to be performed in accordance with one or more embodiments of the disclosure. The processor(s) 432 may include any suitable processing unit capable of accepting data as input, processing the input data in accordance with stored computer-executable instructions, and generating output data. The processor(s) 432 may include any of the types of processors described in connection with the processor(s) 408 and may have any of the microarchitecture designs described in reference thereto.

Referring now to other illustrative components depicted as being stored in the data storage 442, the O/S 444 may be loaded from the data storage 442 into the memory 434 and may provide an interface between other application software executing on the receiver 404 and hardware resources of the receiver 404. More specifically, the O/S 444 may include a set of computer-executable instructions for managing hardware resources of the receiver 404 and for providing common services to other application programs. In certain example embodiments, the O/S 444 may include or otherwise control execution of one or more of the program modules, engines, managers, or the like depicted as being stored in the data storage 442. The O/S 444 may include any operating system now known or which may be developed in the future including, but not limited to, any server operating system, any mainframe operating system, or any other proprietary or non-proprietary operating system.

The DBMS 446 may be loaded into the memory 434 and may support functionality for accessing, retrieving, storing, and/or manipulating data stored in the memory 434, data stored in the data storage 442, and/or data stored in external datastore(s) 454. The DBMS 446 may use any of a variety of database models (e.g., relational model, object model, etc.) and may support any of a variety of query languages. The DBMS 446 may access data represented in one or more data schemas and stored in any suitable data repository. External datastore(s) 454 that may be accessible by the receiver 404 via the DBMS 446 may include, but are not limited to, any of those previously described.

Referring now to other illustrative components of the receiver 404, the input/output (I/O) interface(s) 436 may facilitate the receipt of input information by the receiver 404 from one or more I/O devices as well as the output of information from the receiver 404 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the receiver 404 or may be separate. The I/O devices may further include, for example, any number of peripheral devices such as data storage devices, printing devices, and so forth.

The I/O interface(s) 436 may also include an interface for an external peripheral device connection such as universal serial bus (USB), FireWire, Thunderbolt, Ethernet port or other connection protocol that may connect to one or more networks. The I/O interface(s) 436 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The receiver 404 may further include one or more network interfaces 438 via which the receiver 404 may communicate with any of a variety of other systems, platforms, networks, devices, and so forth. The network interface(s) 438 may enable communication, for example, with one or more other devices via one or more of the network(s) 406.

It should be appreciated that the program modules/engines depicted in FIG. 4 as being stored in the data storage 418 or the data storage 442 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the sender 402, the receiver 404, and/or other computing devices accessible via the network(s) 406, may be provided to support functionality provided by the modules depicted in FIG. 4 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 4 may be implemented, at least partially, in hardware and/or firmware across any number of devices.

It should further be appreciated that the sender 402 and/or the receiver 404 may include alternate and/or additional hardware, software, or firmware components beyond those described or depicted without departing from the scope of the disclosure. More particularly, it should be appreciated that software, firmware, or hardware components depicted as forming part of the sender 402 and/or the receiver 404 are merely illustrative and that some components may not be present or additional components may be provided in various embodiments. While various illustrative modules have been depicted and described as software modules stored in data storage 418 or the data storage 442, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of the method 200 may be performed by a sender 402 having the illustrative configuration depicted in FIG. 4, or more specifically, by one or more program modules, engines, applications, or the like executable on such a device. Similarly, one or more operations of the method 300 may be performed by a receiver 404 having the illustrative configuration depicted in FIG. 4, or more specifically, by one or more program modules, engines, applications, or the like executable on such a device. It should be appreciated, however, that such operations may be implemented in connection with numerous other device configurations.

The operations described and depicted in the illustrative methods of FIGS. 2 and 3 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 2 and 3 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for generating a keystream, the method comprising:
   generating, by a computer processor of a sending device, a session key that includes a plurality of subkeys;
   identifying, by the computer processor, a plurality of media streams in media data stored in a database that is shared by the sending device and a receiving device, the media streams comprising audio/visual content, wherein the plurality of media streams are stored at indices in the database that correspond to values of the plurality of subkeys;
   aggregating, by the computer processor, the plurality of media streams to generate the keystream;
   encrypting, by the computer processor, a message to generate an encrypted message, the encrypting including using a stream cipher algorithm that uses the keystream as a key; and
   sending, by the computer processor, the encrypted message to the receiving device, wherein at least a portion of the media data stored in the database is utilized by the receiving device to decrypt the encrypted message.

2. The computer-implemented method of claim 1, wherein aggregating the plurality of media streams comprises performing, by the computer processor, an exclusive-or (XOR) operation on the plurality of media streams.

3. The computer-implemented method of claim 1, wherein generating the session key comprises selecting, by the computer processor, a number of the plurality of subkeys based at least in part on a desired level of security for the keystream.

4. The computer-implemented method of claim 3, wherein generating the session key further comprises selecting, by the computer processor, a number of bits for each of the plurality of subkeys based at least in part on the desired level of security for the keystream.

5. The computer-implemented method of claim 1, further comprising:
   encrypting, by the computer processor, the session key using a public key associated with the receiving device to generate an encrypted session key; and
   sending, by the computer processor, the encrypted session key to the receiving device,
   wherein the receiving device is configured to decrypt the encrypted session key using a private key to obtain the session key and utilize the session key to generate the keystream.

6. The computer-implemented method of claim 1, wherein encrypting the message using the keystream to generate the encrypted message comprises performing, by the computer processor, an exclusive-or (XOR) of the message and the keystream.

7. The computer-implemented method of claim 1, further comprising:
   determining, by the computer processor, that a bit length of the message is greater than a bit length of a particular media stream of the plurality of media streams; and
   concatenating, by the computer processor, at least a portion of the particular media stream with the particular media stream to increase the bit length of the particular media stream to at least the bit length of the message.

8. A system for generating a keystream, the system comprising:
   at least one memory storing computer-executable instructions; and
   at least one processor of a sending device, wherein the at least one processor is configured to access the at least one memory and execute the computer-executable instructions to:
     generate a session key that includes a plurality of subkeys;
     identify a plurality of media streams in media data stored in a database that is shared by the sending device and a receiving device, the media streams comprising audio/visual content, wherein the plurality of media streams are stored at indices in the database that correspond to values of the plurality of subkeys;
     aggregate the plurality of media streams to generate the keystream;
     encrypt a message to generate an encrypted message, the encrypting including using a stream cipher algorithm that uses the keystream as a key; and
     send the encrypted message to the receiving device, wherein at least a portion of the media data stored in the database is utilized by the receiving device to decrypt the encrypted message.

9. The system of claim 8, wherein the at least one processor is configured to aggregate the plurality of media streams by executing the computer-executable instructions to perform an exclusive-or (XOR) operation on the plurality of media streams.

10. The system of claim 8, wherein generating the session key comprises selecting a number of the plurality of subkeys based at least in part on a desired level of security for the keystream.

11. The system of claim 10, wherein generating the session key further comprises selecting a number of bits for each of the plurality of subkeys based at least in part on the desired level of security for the keystream.

12. The system of claim 8, wherein at least one processor is further configured to execute the computer-executable instructions to:
   encrypt the session key using a public key associated with the receiving device to generate an encrypted session key; and
   send the encrypted session key to the receiving device,
   wherein the receiving device is configured to decrypt the encrypted session key using a private key to obtain the session key and utilize the session key to generate the keystream.

13. The system of claim 8, wherein the at least one processor is configured to encrypt the message using the keystream by executing the computer-executable instructions to perform an exclusive-or (XOR) of the message and the keystream.

14. The system of claim 8, wherein the at least one processor is further configured to execute the computer-executable instructions to:
   determine that a bit length of the message is greater than a bit length of a particular media stream of the plurality of media streams; and
   concatenate at least a portion of the particular media stream with the particular media stream to increase the bit length of the particular media stream to at least the bit length of the message.

15. A computer program product for generating a keystream, the computer program product comprising a storage medium readable by a processing circuit, the storage medium storing instructions executable by the processing circuit to cause a method to be performed, the method comprising:
   generating a session key that includes a plurality of subkeys;
   identifying a plurality of media streams in media data stored in a database that is shared by the sending device and a receiving device, the media streams comprising audio/visual content, wherein the plurality of media streams are stored at indices in the database that correspond to values of the plurality of subkeys;
   aggregating the plurality of media streams to generate the keystream;
   encrypting a message to generate an encrypted message, the encrypting including using a stream cipher algorithm that uses the keystream as a key; and
   sending the encrypted message from a sending device to the receiving device, wherein at least a portion of the media data stored in the database is utilized by the receiving device to decrypt the encrypted message.

16. The computer program product of claim 15, wherein aggregating the plurality of media streams comprises performing an exclusive-or (XOR) operation on the plurality of media streams.

17. The computer program product of claim 15, wherein generating the session key comprises selecting a number of the plurality of subkeys and a number of bits for each of the plurality of subkeys based at least in part on a desired level of security for the keystream.

18. The computer program product of claim 15, the method further comprising:
   encrypting the session key using a public key associated with the receiving device to generate an encrypted session key; and
   sending the encrypted session key to the receiving device, wherein the receiving device is configured to decrypt the encrypted session key using a private key to obtain the session key and utilize the session key to generate the keystream.

19. The computer program product of claim 15, the method further comprising:
   determining that a bit length of the encrypted message is greater than a bit length of a particular media stream of the plurality of media streams; and
   concatenating at least a portion of the particular media stream with the particular media stream to increase the bit length of the particular media stream to at least the bit length of the encrypted message.

20. The computer program product of claim 15, the method further comprising:
   determining that a bit length of the encrypted message is greater than a bit length of a particular media stream of the plurality of media streams; and
   concatenating at least a portion of a media stream corresponding to a different index in the database with the particular media stream to increase the bit length of the particular media stream to at least the bit length of the encrypted message.

\* \* \* \* \*